(12) United States Patent
Tiirola et al.

(10) Patent No.: US 11,979,867 B2
(45) Date of Patent: May 7, 2024

(54) RADIO RESOURCE MANAGEMENT

(71) Applicant: NOKIA TECHNOLOGIES OY, Espoo (FI)

(72) Inventors: Esa Tiirola, Oulu (FI); Kari Hooli, Oulu (FI); Timo Lunttila, Espoo (FI); Sami-Jukka Hakola, Kempele (FI); Karol Schober, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 358 days.

(21) Appl. No.: 17/595,239

(22) PCT Filed: May 13, 2019

(86) PCT No.: PCT/FI2019/050375
§ 371 (c)(1),
(2) Date: Nov. 11, 2021

(87) PCT Pub. No.: WO2020/229724
PCT Pub. Date: Nov. 19, 2020

(65) Prior Publication Data
US 2022/0217720 A1 Jul. 7, 2022

(51) Int. Cl.
*H04W 72/04* (2023.01)
*H04W 72/0453* (2023.01)
*H04W 72/23* (2023.01)

(52) U.S. Cl.
CPC ....... *H04W 72/0453* (2013.01); *H04W 72/23* (2023.01)

(58) Field of Classification Search
CPC .......... H04W 72/042; H04W 72/0453; H04W 72/23
See application file for complete search history.

(56) References Cited

U.S. PATENT DOCUMENTS 10,448,388 B2 *  10/2019  Hwang  ................... H04L 5/001
11,039,429 B2 *  6/2021  Abdoli  .............. H04W 72/0446
(Continued)

FOREIGN PATENT DOCUMENTS

EP      3327977 A2     5/2018
WO   2018084571 A1    5/2018
WO   2018232284 A1   12/2018

OTHER PUBLICATIONS

European Search Report for Application No. 19928597.4, dated Dec. 13, 2022, 8 pages.

(Continued)

*Primary Examiner* — Alpus Hsu
(74) *Attorney, Agent, or Firm* — Robert P. Michal, Esq.; Carter, DeLuca & Farrell LLP (57) ABSTRACT

An apparatus configured to store a bandwidth part arrangement of the bandwidth part into plural physical resource blocks which are grouped into bundles forming a bundle grid, wherein the bandwidth part includes at least one guard band, to determine at least one of the bundles as partially overlapping with the at least one guard band, each partially overlapping bundle including overlapping and non-overlapping physical resource blocks, and to at least one of: 1) re-assign at least one of the non-overlapping physical resource blocks to a non-overlapping bundle immediately preceding or immediately following, in the bundle grid, the partially overlapping bundle, 2) re-align a first physical resource block of the non-overlapping bundle immediately following the partially overlapped bundle to coincide with a guard band end, and 3) re-align a last physical resource block of the non-overlapping bundle immediately preceding the partially overlapped bundle to coincide with a guard band start.

28 Claims, 5 Drawing Sheets

(56) References Cited

U.S. PATENT DOCUMENTS

| | | | | |
|---|---|---|---|---|
| 11,160,057 | B2* | 10/2021 | Lin | H04W 72/21 |
| 2020/0067676 | A1* | 2/2020 | Yi | H04W 72/0446 |
| 2020/0120642 | A1* | 4/2020 | Hwang | H04W 72/04 |
| 2020/0367288 | A1* | 11/2020 | Dahlman | H04W 74/0833 |
| 2021/0160880 | A1* | 5/2021 | Zhang | H04L 5/0064 |

OTHER PUBLICATIONS

3GPP TSG RAN WG1 Meeting #94, R1-1808492; "Discussion on DL/UL Data Scheduling and HARQ Procedure"; Agenda Item: 7.1.3.3; Source: LG Electronics; Gothenburg, Sweden; Aug. 20-24, 2018; 23 pages.

3GPP TSG RAN WG1 Meeting #96, R1-1903541; "Summary of AI: 7.2.8.2 Enhancements on Multi-TRP/Panel Transmission of Offline Discussion"; Agenda Item: 7.2.8.2; Source: Huawei, HiSilicon; Athens, Greece; Feb. 25-Mar. 1, 2019; 59 pages.

International Search Report and Written Opinion for International Application No. PCT/FI2019/050375, dated Feb. 12, 2020, 14 pages.

3GPP TS 38.214; V15.5.0; "3rd Generation Partnership Project; Technical Specification Group Radio Access Network; NR; Physical layer procedures for data (Release 15)"; Mar. 20219; 103 pages.

3GPP TSG RAN WG1 Meeting #96bis, R1-1904289; "Wideband Operation for NR-Unlicensed"; Agenda Item: 7.2.2.2.5; Source: Intel Corporation; Xi'an, China; Apr. 8-12, 2019; 6 pages.

Braun et al.; "5G NR Physical Downlink Control Channel: Design, Performance and Enhancements"; IEEE Wireless Communications and Networking Conference (WCNC); Apr. 15-18, 2019; 6 pages.

Office Action for India Application No. 202147056752, dated Apr. 1, 2022, 6 pages.

* cited by examiner

FIGURE 1

210 — Storing a bandwidth part configuration indicating an arrangement of the bandwidth part into plural physical resource blocks which are grouped into bundles forming a bundle grid, the bandwidth part comprising at least one guard band

220 — Determining at least one of the bundles as partially overlapping with the at least one guard band, each partially overlapping bundle comprising overlapping and non-overlapping physical resource blocks

230 — Re-assigning at least one of the non-overlapping physical resource blocks to a non-overlapping bundle immediately preceding or immediately following, in the bundle grid, the partially overlapping bundle

240 — Re-aligning a first physical resource block of the non-overlapping bundle immediately following the partially overlapped bundle to coincide with a guard band end

250 — Re-aligning a last physical resource block of the non-overlapping bundle immediately preceding the partially overlapped bundle to coincide with a guard band start

RADIO RESOURCE MANAGEMENT

CROSS-REFERENCE TO RELATED APPLICATIONS

This application is a national stage entry of International Application No. PCT/FI2019/050375, filed May 13, 2019, entitled "RADIO RESOURCE MANAGEMENT" which is hereby incorporated by reference in its entirety.

FIELD

The present disclosure pertains to radio resource management in a wireless communication system.

BACKGROUND

Wireless communication may take place on different kinds of spectrum resources. Where a communication system is assigned as spectrum resources a spectrum band, or bands, for its use, the system may use these spectrum resources with the understanding it is the only, or predominant, user of these resources. For example, governments may assign spectrum bands to telecommunication, radar, television and radio broadcasts, scientific research and other uses. As more parties seek to use spectrum resources, these resources are becoming increasingly scarce.

As an alternative to using spectrum resources assigned to a system, the system may use unlicensed spectrum resources, or resources of another system in case the other system is not currently using them.

BRIEF DESCRIPTION

According to some aspects, there is provided the subject-matter of the independent claims. Some embodiments are defined in the dependent claims.

According to a first aspect of the present disclosure, there is provided an apparatus comprising at least one processing core, at least one memory including computer program code, the at least one memory and the computer program code being configured to, with the at least one processing core, cause the apparatus at least to store a bandwidth part configuration indicating an arrangement of the bandwidth part into plural physical resource blocks which are grouped into bundles forming a bundle grid, the bandwidth part comprising at least one guard band, determine at least one of the bundles as partially overlapping with the at least one guard band, each partially overlapping bundle comprising overlapping and non-overlapping physical resource blocks, and to at least one of: 1) re-assign at least one of the non-overlapping physical resource blocks to a non-overlapping bundle immediately preceding or immediately following, in the bundle grid, the partially overlapping bundle, 2) re-align a first physical resource block of the non-overlapping bundle immediately following the partially overlapped bundle to coincide with a guard band end, and 3) re-align a last physical resource block of the non-overlapping bundle immediately preceding the partially overlapped bundle to coincide with a guard band start. According to a second aspect of the present disclosure, there is provided an apparatus comprising at least one processing core, at least one memory including computer program code, the at least one memory and the computer program code being configured to, with the at least one processing core, cause the apparatus at least to provide to a user device a bandwidth part configuration indicating an arrangement of the bandwidth part into plural physical resource blocks which are grouped into bundles forming a bundle grid, the bandwidth part comprising at least one guard band, determine at least one of the bundles as partially overlapping with the at least one guard band, each partially overlapping bundle comprising overlapping and non-overlapping physical resource blocks, and to at least one of: 1) re-assign at least one of the non-overlapping physical resource blocks to a non-overlapping bundle immediately preceding or immediately following, in the bundle grid, the partially overlapping bundle, 2) re-align a first physical resource block of the non-overlapping bundle immediately following the partially overlapped bundle to coincide with a guard band end, and 3) re-align a last physical resource block of the non-overlapping bundle immediately preceding the partially overlapped bundle to coincide with a guard band start.

According to a third aspect of the present disclosure, there is provided a method, comprising storing a bandwidth part configuration indicating an arrangement of the bandwidth part into plural physical resource blocks which are grouped into bundles forming a bundle grid, the bandwidth part comprising at least one guard band, determining at least one of the bundles as partially overlapping with the at least one guard band, each partially overlapping bundle comprising overlapping and non-overlapping physical resource blocks, and at least one of: 1) re-assigning at least one of the non-overlapping physical resource blocks to a non-overlapping bundle immediately preceding or immediately following, in the bundle grid, the partially overlapping bundle, 2) re-aligning a first physical resource block of the non-overlapping bundle immediately following the partially overlapped bundle to coincide with a guard band end, and 3) re-aligning a last physical resource block of the non-overlapping bundle immediately preceding the partially overlapped bundle to coincide with a guard band start.

According to a fourth aspect of the present disclosure, there is provided a method, comprising providing to a user device a bandwidth part configuration indicating an arrangement of the bandwidth part into plural physical resource blocks which are grouped into bundles forming a bundle grid, the bandwidth part comprising at least one guard band, determining at least one of the bundles as partially overlapping with the at least one guard band, each partially overlapping bundle comprising overlapping and non-overlapping physical resource blocks, and at least one of: 1) re-assigning at least one of the non-overlapping physical resource blocks to a non-overlapping bundle immediately preceding or immediately following, in the bundle grid, the partially overlapping bundle, 2) re-aligning a first physical resource block of the non-overlapping bundle immediately following the partially overlapped bundle to coincide with a guard band end, and 3) re-aligning a last physical resource block of the non-overlapping bundle immediately preceding the partially overlapped bundle to coincide with a guard band start.

According to a fifth aspect of the present disclosure, there is provided an apparatus comprising means for storing a bandwidth part configuration indicating an arrangement of the bandwidth part into plural physical resource blocks which are grouped into bundles forming a bundle grid, the bandwidth part comprising at least one guard band, means for determining at least one of the bundles as partially overlapping with the at least one guard band, each partially overlapping bundle comprising overlapping and non-overlapping physical resource blocks, and at least one of: 1) means for re-assigning at least one of the non-overlapping physical resource blocks to a non-overlapping bundle immediately preceding or immediately following, in the bundle grid, the partially overlapping bundle, 2) means for re-aligning a first physical resource block of the non-overlapping bundle immediately following the partially overlapped bundle to coincide with a guard band end, and 3) means for re-aligning a last physical resource block of the non-overlapping bundle immediately preceding the partially overlapped bundle to coincide with a guard band start.

According to a sixth aspect of the present disclosure, there is provided an apparatus comprising means for providing to a user device a bandwidth part configuration indicating an arrangement of the bandwidth part into plural physical resource blocks which are grouped into bundles forming a bundle grid, the bandwidth part comprising at least one guard band, means for determining at least one of the bundles as partially overlapping with the at least one guard band, each partially overlapping bundle comprising overlapping and non-overlapping physical resource blocks, and at least one of: 1) means for re-assigning at least one of the non-overlapping physical resource blocks to a non-overlapping bundle immediately preceding or immediately following, in the bundle grid, the partially overlapping bundle, 2) means for re-aligning a first physical resource block of the non-overlapping bundle immediately following the partially overlapped bundle to coincide with a guard band end, and 3) means for re-aligning a last physical resource block of the non-overlapping bundle immediately preceding the partially overlapped bundle to coincide with a guard band start.

According to a ninth aspect of the present disclosure, there is provided a computer program configured to cause a method in accordance with at least one of the third and fourth aspects to be performed, when run.

BRIEF DESCRIPTION

EMBODIMENTS

Management of physical resource block, PRB, bundles is enhanced by enabling a more efficient PRB bundle grid by adapting it to presence of guard bands in a bandwidth part, BWP. In detail, PRBs not overlapping with a guard band in a bundle where a subset of the PRBs of the bundle do overlap with a guard band are used together with PRBs of a bundle with all non-overlapping PRBs, that is. PRBs which do overlap with a guard band may be ignored, or, where possible, scheduled for user devices, (UE), which are capable of receiving channels mapped to these PRBs.

Figure 1:
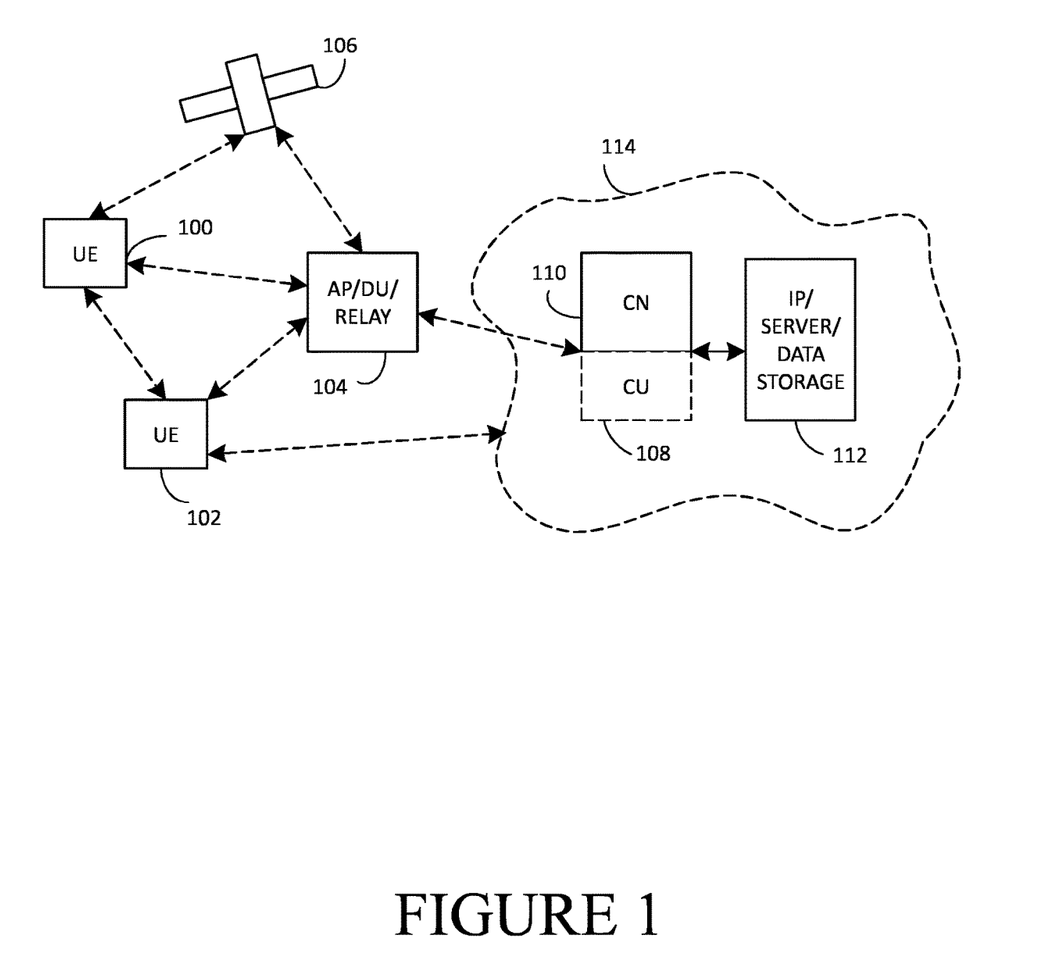
FIG. 1 illustrates an example system in accordance with at least some embodiments.

FIG. 1 illustrates an example system in accordance with at least some embodiments. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. The embodiments are not, however, restricted to the system given as an example but a person skilled in the art may apply the solution to other communication systems provided with necessary properties. Examples of such other communication systems include microwave links and optical fibers, for example.

The example of FIG. 1 shows a part of an exemplifying radio access network. FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage. A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of the communication system it is coupled to. The NodeB may also be referred to as a base station, an access point or any other type of interfacing device including a relay station such as DU (distributed unit) part of IAB (integrated access and backhaul) node capable of operating in a wireless environment. The DU part may facilitate the gNB functionalities of the IAB node. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, also including a relay node. An example of such scenario is MT (mobile termination) part of IAB node, which provides the backhaul connection for the IAB node.

The user device, or user equipment, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors, microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented inside these apparatuses, to enable the functioning thereof. 5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is distributed in the radio and centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements, such as Big Data and all-IP, may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. A cellular radio system may be implemented as a multilayer network including several kinds of cells, such as macrocells, microcells and picocells, for example. Typically, in multilayer networks, one access node provides one kind of a cell or cells, and thus a plurality of (e/g)NodeBs are required to provide such a network structure.

In unlicensed-band NR operation, a bandwidth part, BWP, may comprise a plurality of sub-bands separated from each other by one or more guard bands. The sub-bands may be, but need not be, 20 MHz wide, for example. Operation on the BWP may proceed based on sub-band specific listen-before-talk, LBT, operation. In LBT, a node desiring to use a spectrum resource will listen on the resource before using it, and only proceed to transmit on the resource in case the listening indicates the resource appears to be free, that is, not currently in use. Simultaneous use of the same resource by plural transmitters leads to interference and decreased quality of communication on the resource.

A bandwidth part, BWP, is a contiguous set of physical resource blocks, PRBs, on a given carrier. A carrier bandwidth may be 40 MHz, 80 MHz or 160 MHz, for example. These PRBs are selected from a contiguous subset of the usable common resource blocks for a given numerology on a carrier. A BWP may be characterized by the following features: subcarrier spacing, SCS, sub-band number and sub-band bandwidth. SCS may take values such as 15 kHz, 30 kHz or 60 kHz, for example. A carrier may comprise 2, 3, 4, 5 or 8 sub-bands of 20-MHz bandwidth, for example. A PRB may have 12 subcarriers, for example. Likewise, a normal scheduling unit in time (known as a slot) may be 12 or 14 orthogonal frequency-division multiplexing (OFDM) symbols long. Furthermore, NR supports mini-slot based operation with the scheduling unit in time smaller than one slot, for example 2, 4 or 7 OFDM symbols. In 5G, the PRB may be both 12 subcarriers wide and 14 OFDM symbols long, assuming normal cyclic prefix. A transmission bandwidth, TX BW, is a part of the spectrum on which a base node actually transmits following the listening phase of LBT of a sub-band specific LBT process. The TX BW may be the entire bandwidth of BWP, or a portion thereof, in dependence of a result of the listening phase.

Figure 2:
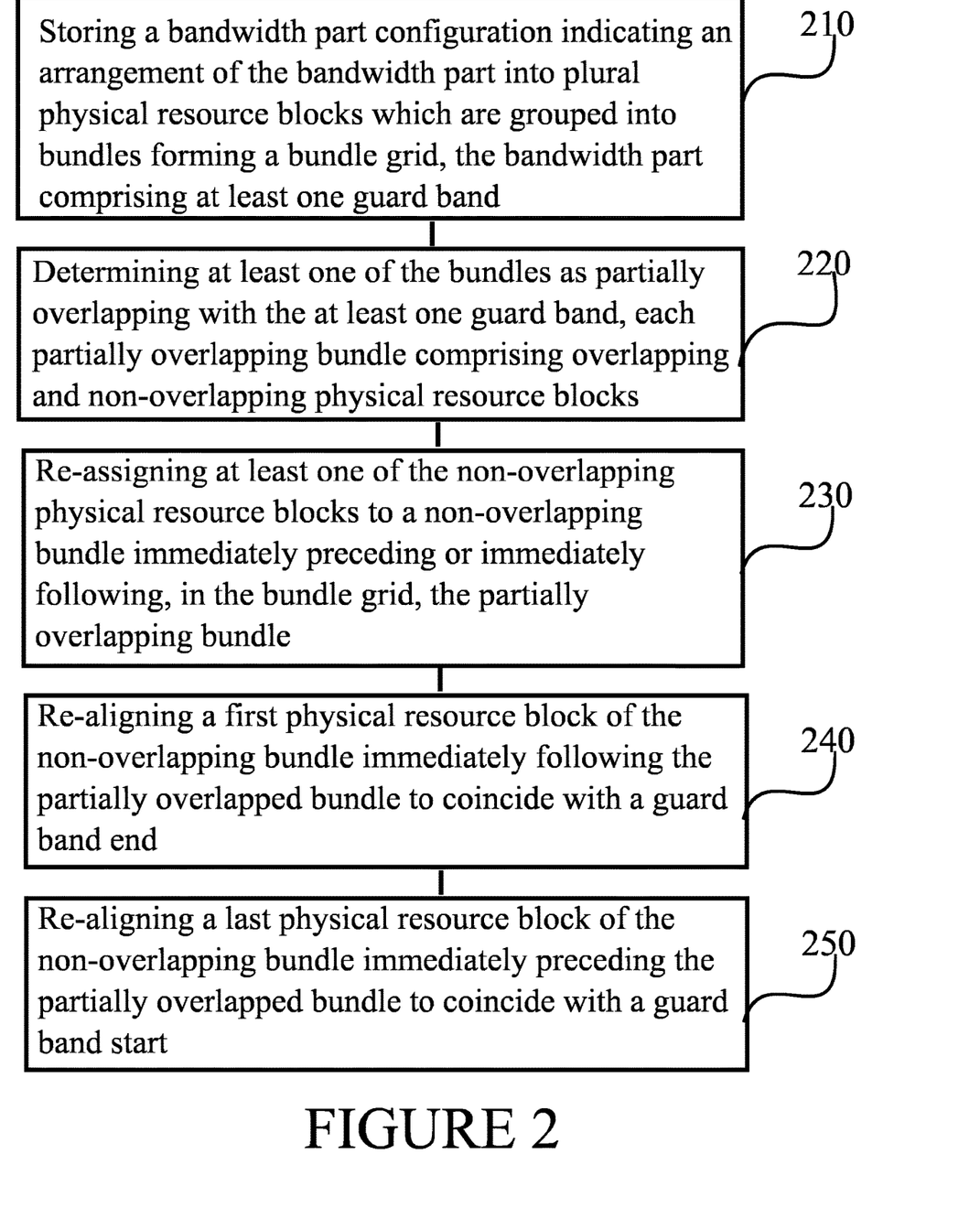
FIG. 2 is a flow graph of a method in accordance with at least some embodiments.

FIG. 2 is a flow graph of a method in accordance with at least some embodiments. The phases of the illustrated method may be performed in a user device, for example, or in a controller of a user device, such as a chip or chipset, when such a controller is installed in the user device. The user device may be a 5G-compatible user device operating on an unlicensed band, for example. The method may be implemented as a software code in which case the coding of software for carrying out the embodiments shown and described below is well within the scope of a person of ordinary skill in the art.

Phase 210 comprises storing a bandwidth part configuration indicating an arrangement of the bandwidth part into plural physical resource blocks, PRBs which are grouped into bundles forming a bundle grid, the bandwidth part comprising at least one guard band. The bandwidth part may be a wideband bandwidth part, for example one comprising plural sub-bands with guard bands in between the sub-bands. Sub-bands may be 20-MHz wide, for example. The bandwidth part configuration may be received via broadcast signalling, radio resource control signalling and/or higher-layer signalling, for example. Guard bands may be 5 or 6 PRBs wide, for example.

It should be appreciated that when the method is carried out by an access node, such as gNodeB, phase 210 may comprise, instead of storing, providing a user device with the bandwidth part configuration described above.

Phase 220 comprises determining at least one of the bundles as partially overlapping with the at least one guard band, each partially overlapping bundle comprising overlapping and non-overlapping physical resource blocks. The method further comprises any one, two or three of phases 230, 240 and 250. In other words, the method may comprise phase 230 alone, phase 240 alone or phase 250 alone. Alternatively, it may comprise all of phases 230, 240 and 250. Alternatively, it may comprise phases 230 and 240, phases 240 and 250 or phases 230 and 250.

Phase 230 comprises re-assigning at least one of the non-overlapping physical resource blocks to a non-overlapping bundle immediately preceding or immediately following, in the bundle grid, the partially overlapping bundle. Phase 240 comprises re-aligning a first physical resource block of the non-overlapping bundle immediately following the partially overlapped bundle to coincide with a guard band end. Phase 250 comprises re-aligning a last physical resource block of the non-overlapping bundle immediately preceding the partially overlapped bundle to coincide with a guard band start.

When re-aligning, the method may comprise re-aligning also bundles following or preceding the immediately following or immediately preceding bundles, respectively by shifting them by the same number of PRBs. When re-aligning, the method may also comprise renumbering the bundles, such that following the re-aligning the bundles are consecutively numbered in the bundle grid. The re-aligning may result in the bundles being adjacent to each other in the bundle grid. By adjacency it is herein meant that no PRBs are between the bundles. The method may further comprise using the PRB bundles as modified in phase 230 and/or phase 240 in communication, for example as precoding PRB bundles, resource allocation bundles or as a granularity basis for measurements for channel estimation.

A bundle size in terms of physical resource blocks may be constant in the bundle grid before the re-assigning. For example, such a bundle size may be 2, 4, 8 or 16 PRBs. The re-assigning may comprise re-assigning the at least one non-overlapping physical resource block to the immediately preceding bundle when the overlapping physical resource blocks are last in the partially overlapped bundle, and/or re-assigning at least one non-overlapping physical resource block to the immediately following bundle when the overlapping physical resource blocks are first in the partially overlapped bundle. In other words, the PRBs may be re-assigned to a closest non-overlapping bundle.

The PRB bundles may have several useful roles. For example, they may be used to provide a coarser than PRB-specific granularity for bitmap type resource allocation, thus reducing a signalling load in the network. Such allocation may be used on physical uplink shared channel, PUSCH, uplink sounding reference signal, SRS, or physical downlink shared channel, PDSCH, for example. Further, PRB bundles may be used in providing reasonable resolution (granularity) for channel estimation or channel state information, CSI, measurements. PRB bundles are also usable in forming a resource grid for frequency-hopping solutions, e.g., for SRS. Where the system utilizes precoder cycling-based transmission diversity, PRB bundles may be used as precoding units for a specific UE, and a single precoding vector may be used with PRBs in a single bundle. In other words, the PRB bundling may act as a precoding granularity. In other words, while a PRB may be a unit of allocation, allocating bundles of PRBs may be more efficient in terms of signalling when individual PRB accuracy is not needed.

Figure 3:
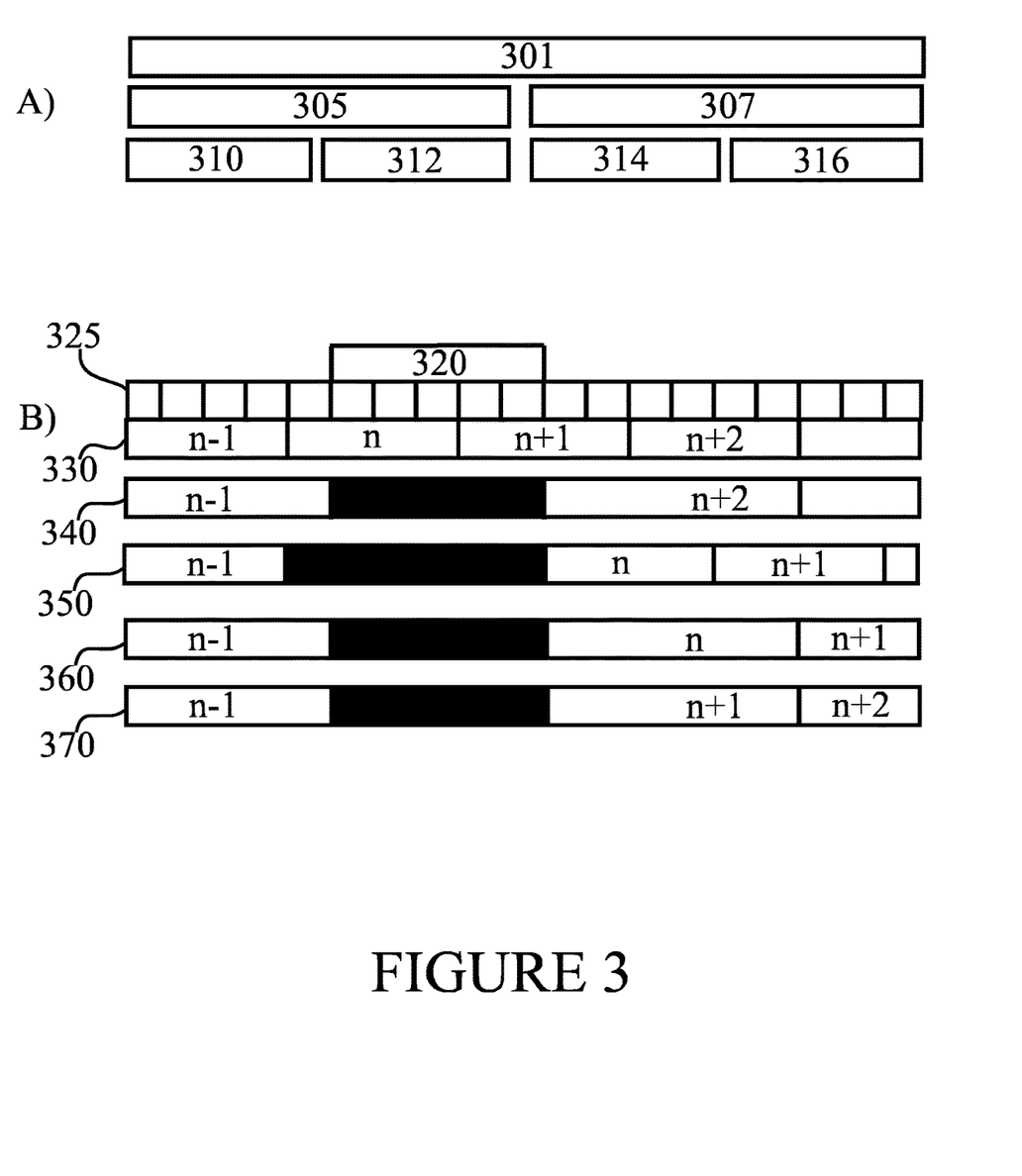
FIG. 3 illustrates bandwidth part structures relevant to at least some embodiments.

FIG. 3 illustrates bandwidth part structures relevant to at least some embodiments. In the upper part of the figure, labelled "A)", is an example bandwidth part, referred to as a carrier/BWP to allow for the case where the BWP covers an entire carrier. A carrier/BWP 301, spanning 216 PRBs, is sub-divided into two further carriers/BWPs 305 and 307, each spanning 105 PRBs. A guard band of six PRBs separates carrier/BWPs 305 and 307, which are each sub-divided into two sub-bands. The sub-bands 310, 312, 314 and 316 each span 50 PRBs, leaving guard bands of five or six PRBs between the sub-bands of the same carrier/BWP.

In the lower part of the figure, labelled "B)", four ways of managing PRBs of bundles partially overlapping a guard band 320 are illustrated. A grid of PRBs 325 is illustrated, forming part of the BWP. A bundle grid 330 is disposed under the PRB grid 325, in this example case each bundle initially has four PRBs. Bundles n and n+1 are partially overlapping with guard band 320, in other words, these bundles comprise both overlapping and non-overlapping PRBs. For example, the first PRB of bundle n is non-overlapping, while the three last PRBs are overlapping since they are in the frequency range of guard band 320.

Bundle grid 340 represents the grid after non-overlapping PRBs have been re-assigned to non-overlapping bundles, that is, to bundles with only non-overlapping PRBs. In detail, the first PRB of bundle n is re-assigned to bundle n−1, and the last two PRBs of bundle n+1 are re-assigned to bundle n+2. This provides advantages in terms of operating the system, since channel estimation and CSI reporting, for example, are run with bundles with more than one or two PRBs, producing more dependable results, such as better channel estimates.

Bundle grid 350 represents the grid after a first PRB of a non-overlapping bundle is re-aligned with an end of guard band 320. In detail, the first non-overlapping bundle immediately following the guard band in the bundle grid is re-aligned as beginning at the end of the guard band. Also bundles following the first non-overlapping bundle are shifted by the same amount, resulting in a contiguous bundle grid. An advantage of this arrangement is that the bundles have consecutive numbering. This can be beneficial e.g. in the SRS scenario. On the other hand, the first PRB of partially overlapping original bundle n is ignored, which misses a communication opportunity using this PRB.

Bundle grid 360 represents the grid after both the re-assigning of grid 340 and the re-aligning of grid 350 have been performed. In other words, bundle n has been re-defined as starting from the end of guard period 320, and additionally the non-overlapping (first) PRB of original bundle n has been re-assigned to non-overlapped bundle n−1.

Bundle grid 370 is a variant of bundle grid 360, the difference being in the bundle numbering. While in grid 360 the overlapping PRBs are ignored and not counted as a bundle, in grid 370 these ignored PRBs are considered to form a non-used PRB bundle with number n.

In FIG. 3, part B), the overlapping PRBs are coloured black and the system does not use them, as basic UEs are in general not assumed to be capable of reception, such as shared channel reception, such as physical downlink shared channel, PDSCH, reception, in guard bands. In some embodiments, the system may make allowance for UEs which are capable of such reception, which may require an ability to adapt a baseband, BB, filter of the UE before use. Such systems may leverage this to multiplex the set of UEs to transmit to the UEs capable of guard band reception using the overlapping PRBs and preferentially transmit to UEs not capable of guard band reception using non-overlapped PRBs.

Different ones of the options of part B) of the figure are suitable for different situations. For example, bundle grids 340, 360 and 370 maintain overall the same PRB bundle boundaries, which is useful when some UEs use the guard bands for communication and some do not. The redefined alternative, grid 350, may be useful where opportunities for resource adaptation are limited. This may be the case, for example, where uplink SRS transmission follows a pre-defined frequency hopping pattern.

Using the principles described herein above, frequency hopping SRS transmissions may be performed more efficiently, since it will happen much more infrequently that a SRS transmission has to be dropped for the reason that it would be partially on the guard band frequency. Instead, the SRS transmissions may be performed using the modified PRB bundle grid, which reduces the effects of the guard bands. For example, where the PRB bundles are caused to be consecutively numbered, a hopping pattern may be followed since all the PRB bundle numbers will be available. The way re-alignment facilitates SRS transmissions with frequency hopping is when a SRS position overlaps with a guard band, the SRS position, as well as following SRS positions, are moved forward in frequency so that SRS overlap with the guard band is avoided. The redefined SRS position may be aligned with guard band boundary or may be moved further forward by a predetermined or configured offset value, for example. This mechanism maintains frequency-division multiple access, FDMA, characteristics of the SRS transmission.

Figure 4:
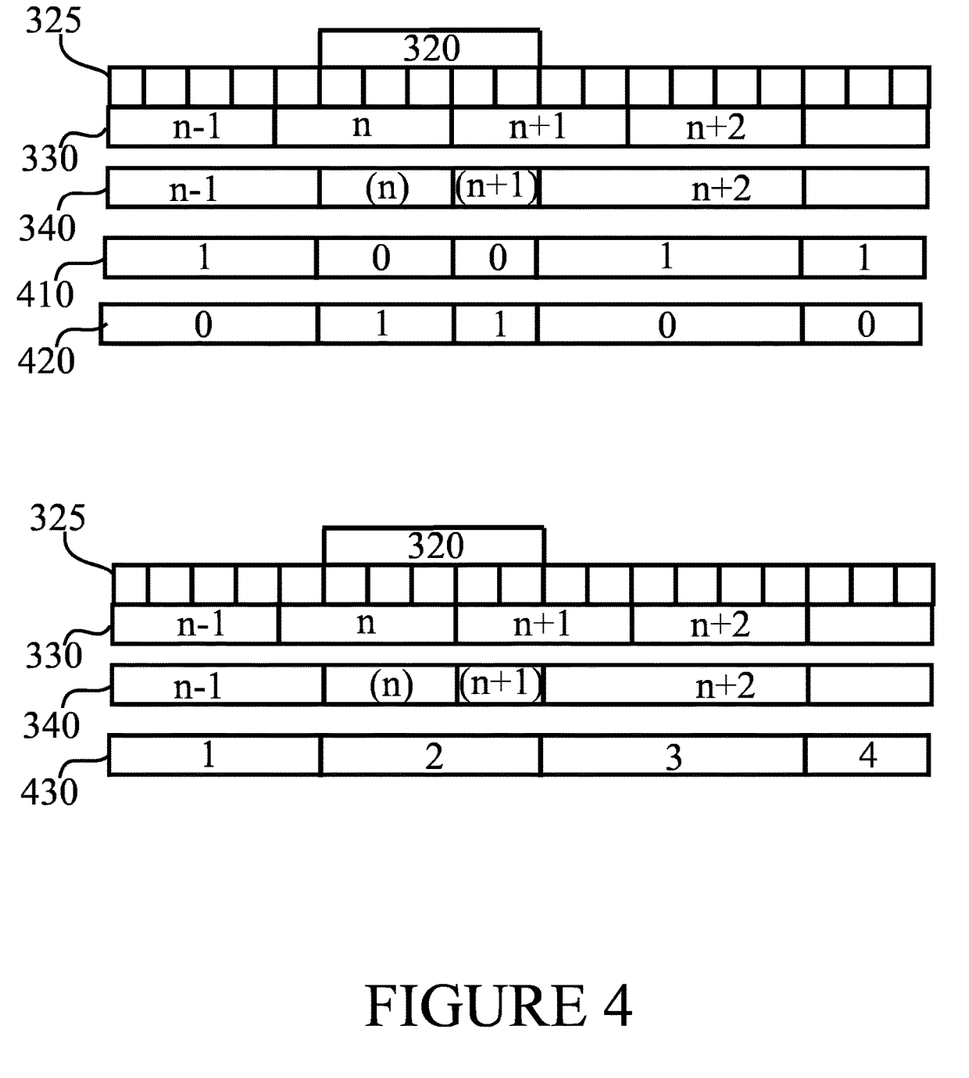
FIG. 4 illustrates procedures in accordance with at least some embodiments.

FIG. 4 illustrates procedures in accordance with at least some embodiments. In the upper part of the figure is a multiplexing example already alluded to above, namely for user devices (UEs) capable and not capable of reception in guard bands. Elements 320, 325, 330 and 340 correspond to similarly numbered elements in FIG. 3. In detail, PRB bundle grid 340 is the bundle grid where non-overlapping PRBs of partially overlapped bundles have been re-assigned to non-overlapped bundles. As a consequence, the remaining, overlapped, PRBs are ignored, unless UEs are present that can use them. This is schematically presented in FIG. 4 by placing the bundle numbers of the affected bundles in parentheses.

Resource allocation 410 corresponds to UEs not capable of receiving from guard bands, such as guard band 320. As a consequence, these UEs may receive in PRB bundles n−1, and again from n+2 onward. On the other hand, resource allocation 420 corresponds to UEs capable of receiving from guard bands, such as guard band 320. As a consequence, these UEs may receive in PRB bundles n and n+1, and they may be preferentially scheduled to receive from those PRBs so as to leave more PRBs for UEs which cannot receive those. If needed, these UEs may also be scheduled non-overlapping PRBs, for example in case a communication capacity of the overlapped PRBs alone is insufficient.

It may not be feasible to utilize guard bands for DL reception at the beginning of a channel occupancy time, COT. This is so since, at least at the beginning of a channel occupancy, UE-side baseband filtering may need to be prepared to suit any transmission bandwidth, TX BW. Hence, guard bands are present (that it, PDSCH cannot be scheduled on the guard bands) even in the case when TX BW covers all LBT sub-bands. When the UE is aware of the LBT outcome, and if a UE can adjust its baseband filters during the COT, then it may be possible to use also guard bands for DL reception for the later parts of the COT. This may be facilitated by an introduction of a switching gap within the COT for those UEs.

The lower part of FIG. 4 relates to demodulation reference signal, DMRS, determination. The bundle grid 340 of the example in the upper part of the figure is used. In some embodiments, a UE determines the PDSCH DMRS bundle by combining and redefining. This guarantees that the UE can obtain a reliable channel estimate for all PRBs to support higher order modulations and coding rates. A UE using a 4-PRB channel filter may perform two partially overlapping channel estimates on a bundle of 5 PRBs, one for PRBs 1-4 and another one for PRBs 2-5. The transmit precoder used is illustrated in grid 430.

In NR, as defined in release 15 of the relevant specifications, when a UE is configured to report channel state information-reference signal (CSI-RS) resource indicator, CRI, rank indicator, RI, wideband precoding matrix indicator, PMI, (aka i1) and channel quality indicator, CQI, the UE calculates the CQI conditioned on the reported $i_1$ assuming CQI assuming PDSCH transmission with $N_p \geq 1$ precoders, where the UE assumes that one precoder is randomly selected from the set of $N_p$ precoders for each physical resource block group, PRG, on PDSCH, where the PRG size for CQI calculation is configured by the higher layer parameter, known as pdsch-BundleSizeForCSI.

When the PRB bundle of the CSI-RS overlaps partially with a guard band, the UE performs a special handling for the determined PRB bundle. Assuming now handling of partially overlapping bundles as in bundle grid 370 of FIG. 3, the UE may determine the actual PRB bundle size for the PRB bundles around the guard band as follows: PRB bundle n−2 to be normal size (size 4), PRB bundle n−1 to have extended size (size 5), PRB bundle "n" (acting as a GB) to have size of the GB (size 5), PRB bundle n+1 to have extended size (size 6), and PRB bundle n+2 and subsequent bundles to be normal size (size 4).

Overall, the PRB bundle management processes disclosed herein facilitate at least the following technical advantages: performance of the communication system is rendered more predictable and robust since channel estimation and CSI measurement reporting is based on better statistics, a smooth co-existence between UEs of different capabilities is provided, such as UEs capable and not capable of the guard band reception, SRS signal dropping may be reduced and specification impact is modest.

Figure 5:
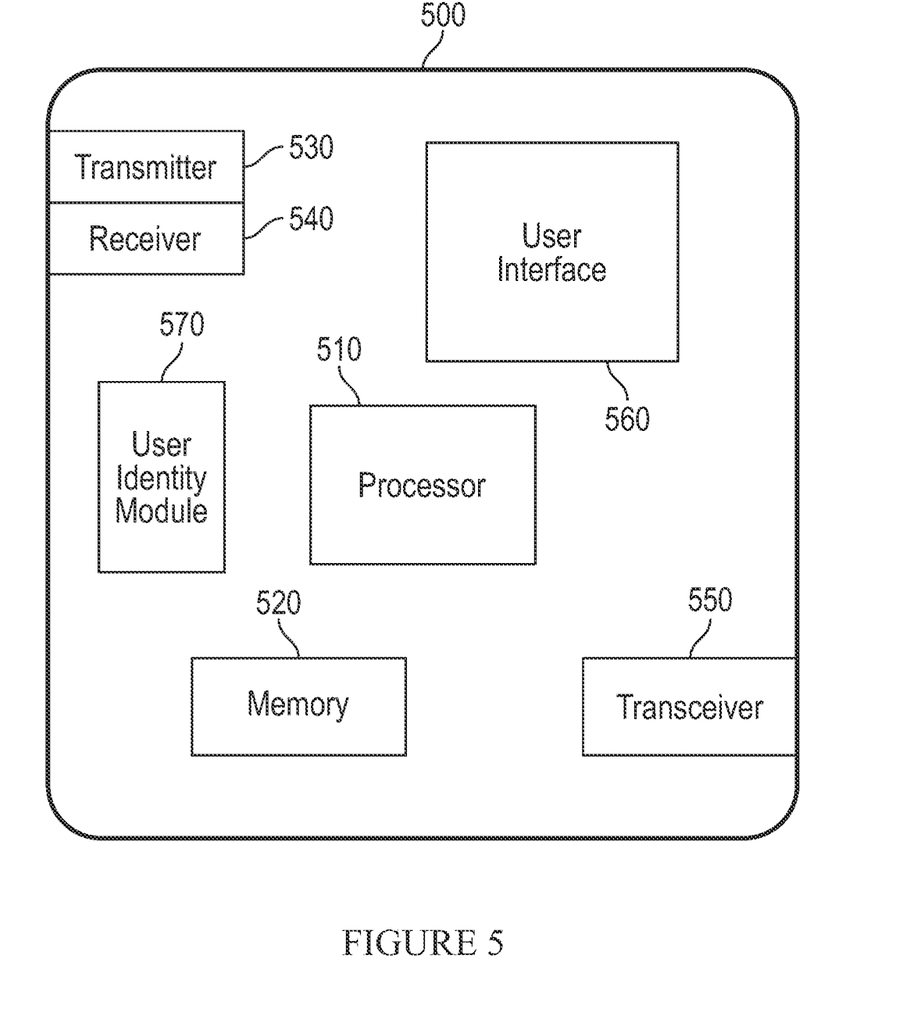
FIG. 5 is a flow graph of a method in accordance with at least some embodiments.

FIG. 5 illustrates an example apparatus capable of supporting at least some embodiments presented above. Illustrated is device 500, which may comprise, for example, a mobile communication device such as a UE or, in applicable parts, an access node such as an eNB or gNB. The apparatus may also be a distributed unit (DU) or a central unit (CU) of a gNodeB. Comprised in device 500 is processor 510, which may comprise, for example, a single- or multi-core processor wherein a single-core processor comprises one processing core and a multi-core processor comprises more than one processing core. Processor 510 may comprise, in general, a control device. Processor 510 may comprise more than one processor. Processor 510 may be a control device. A processing core may comprise, for example, a Cortex-A8 processing core manufactured by ARM Holdings or a Steamroller processing core designed by Advanced Micro Devices Corporation. Processor 510 may comprise at least one Qualcomm Snapdragon and/or Intel Atom processor. Processor 510 may comprise at least one application-specific integrated circuit, ASIC. Processor 510 may comprise at least one field-programmable gate array, FPGA. Processor 510 may be means for performing method steps in device 500. Processor 510 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device or apparatus 500 may comprise memory 520. Memory 520 may comprise random-access memory and/or permanent memory. Memory 520 may comprise at least one RAM chip. Memory 520 may comprise solid-state, magnetic, optical and/or holographic memory, for example. Memory 520 may be at least in part accessible to processor 510. Memory 520 may be at least in part comprised in processor 510. Memory 520 may be means for storing information. Memory 520 may comprise computer instructions that processor 510 is configured to execute. When computer instructions configured to cause processor 510 to perform certain actions are stored in memory 520, and device 500 overall is configured to run under the direction of processor 510 using computer instructions from memory 520, processor 510 and/or its at least one processing core may be considered to be configured to perform said certain actions. Memory 520 may be at least in part comprised in processor 510. Memory 520 may be at least in part external to device 500 but accessible to device 500.

Device 500 may comprise a transmitter 530. Device 500 may comprise a receiver 540. Transmitter 530 and receiver 540 may be configured to transmit and receive, respectively, information in accordance with at least one cellular or non-cellular standard. Transmitter 530 may comprise more than one transmitter. Receiver 540 may comprise more than one receiver. Transmitter 530 and/or receiver 540 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 500 may comprise a near-field communication, NFC, transceiver 550. NFC transceiver 550 may support at least one NFC technology, such as NFC, Bluetooth, Wibree or similar technologies.

The apparatus or device may be, include or be associated with at least one software application, module, unit or entity configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. The data storage medium may be a non-transitory medium. The computer program or computer program product may also be downloaded to the apparatus. A computer program product may comprise one or more computer-executable components which, when the program is run, for example by one or more processors possibly also utilizing an internal or external memory, are configured to carry out any of the embodiments or combinations thereof described above. The one or more computer-executable components may be at least one software code or portions thereof.

Device 500 may comprise user interface, UI, 560. UI 560 may comprise at least one of a display, a keyboard, a touchscreen, a vibrator arranged to signal to a user by causing device 500 to vibrate, a speaker and a microphone. A user may be able to operate device 500 via UI 560, for example to accept incoming telephone calls, to originate telephone calls or video calls, to browse the Internet, to manage digital files stored in memory 520 or on a cloud accessible via transmitter 530 and receiver 540, or via NFC transceiver 550, and/or to play games.

Device 500 may comprise or be arranged to accept a user identity module 570. User identity module 570 may comprise, for example, a subscriber identity module, SIM, card installable in device 500. A user identity module 570 may comprise information identifying a subscription of a user of device 500. A user identity module 570 may comprise cryptographic information usable to verify the identity of a user of device 500 and/or to facilitate encryption of communicated information and billing of the user of device 500 for communication effected via device 500.

Processor 510 may be furnished with a transmitter arranged to output information from processor 510, via electrical leads internal to device 500, to other devices comprised in device 500. Such a transmitter may comprise a serial bus transmitter arranged to, for example, output information via at least one electrical lead to memory 520 for storage therein. As an alternative to a serial bus, the transmitter may comprise a parallel bus transmitter. Likewise, processor 510 may comprise a receiver arranged to receive information in processor 510, via electrical leads internal to device 500, from other devices comprised in device 500. Such a receiver may comprise a serial bus receiver arranged to, for example, receive information via at least one electrical lead from receiver 540 for processing in processor 510. As an alternative to a serial bus, the receiver may comprise a parallel bus receiver.

Device 500 may comprise further devices not illustrated in FIG. 5. For example, where device 500 comprises a smartphone, it may comprise at least one digital camera. Some devices 500 may comprise a back-facing camera and a front-facing camera, wherein the back-facing camera may be intended for digital photography and the front-facing camera for video telephony. Device 500 may comprise a fingerprint sensor arranged to authenticate, at least in part, a user of device 500. In some embodiments, device 500 lacks at least one device described above. For example, some devices 500 may lack a NFC transceiver 550 and/or user identity module 570.

Processor 510, memory 520, transmitter 530, receiver 540, NFC transceiver 550, UI 560 and/or user identity module 570 may be interconnected by electrical leads internal to device 500 in a multitude of different ways. For example, each of the aforementioned devices may be separately connected to a master bus internal to device 500, to allow for the devices to exchange information. However, as the skilled person will appreciate, this is only one example and depending on the embodiment various ways of interconnecting at least two of the aforementioned devices may be selected without departing from the scope of the present invention.

As another example of an apparatus, it is presented an apparatus comprising means (520) for storing a bandwidth part configuration indicating an arrangement of the bandwidth part into plural physical resource blocks which are grouped into bundles forming a bundle grid, the bandwidth part comprising at least one guard band; means (510, 520) for determining at least one of the bundles as partially overlapping with the at least one guard band, each partially overlapping bundle comprising overlapping and non-overlapping physical resource blocks, and at least one of: means (510) for re-assigning at least one of the non-overlapping physical resource blocks to a non-overlapping bundle immediately preceding or immediately following, in the bundle grid, the partially overlapping bundle, means (510) for re-aligning a first physical resource block of the non-overlapping bundle immediately following the partially overlapped bundle to coincide with a guard band end, and means (510) for re-aligning a last physical resource block of the non-overlapping bundle immediately preceding the partially overlapped bundle to coincide with a guard band start. The apparatus may be a user device (such as UE).

As yet another example of an apparatus, it is presented an apparatus comprising means (510, 530) for providing a user device with a bandwidth part configuration indicating an arrangement of the bandwidth part into plural physical resource blocks which are grouped into bundles forming a bundle grid, the bandwidth part comprising at least one guard band; means (510) for determining at least one of the bundles as partially overlapping with the at least one guard band, each partially overlapping bundle comprising overlapping and non-overlapping physical resource blocks, and at least one of: means (510) for re-assigning at least one of the non-overlapping physical resource blocks to a non-overlapping bundle immediately preceding or immediately following, in the bundle grid, the partially overlapping bundle, means (510) for re-aligning a first physical resource block of the non-overlapping bundle immediately following the partially overlapped bundle to coincide with a guard band end, and means (510) for re-aligning a last physical resource block of the non-overlapping bundle immediately preceding the partially overlapped bundle to coincide with a guard band start. The apparatus may be an access node, such as a gNodeB. The apparatus may also be a part of the access node, such as a distributed unit (DU) or a central unit (CU).

Although the apparatus has been depicted as one entity in FIG. 5, different modules or units and memory may be implemented in one or more physical or logical entities.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus comprising at least one processing core, at least one memory comprising a computer program code, the at least one memory and the computer program code being configured to, with the at least one processing core, cause the apparatus at least to:
   store a bandwidth part configuration indicating an arrangement of the bandwidth part into plural physical resource blocks which are grouped into bundles forming a bundle grid, the bandwidth part comprising at least one guard band;
   determine at least one of the bundles as partially overlapping with the at least one guard band, each partially overlapping bundle comprising overlapping and non-overlapping physical resource blocks, and to at least one of:
   re-assign at least one of the non-overlapping physical resource blocks to a non-overlapping bundle immediately preceding or immediately following, in the bundle grid, the partially overlapping bundle,
   re-align a first physical resource block of the non-overlapping bundle immediately following the partially overlapped bundle to coincide with a guard band end, and
   re-align a last physical resource block of the non-overlapping bundle immediately preceding the partially overlapped bundle to coincide with a guard band start.

2. The apparatus according to claim 1, wherein the bandwidth part is a wideband bandwidth part comprising at least two sub-bands, and the at least one guard band is between the at least two sub-bands.

3. The apparatus according to claim 1, wherein the at least one processing core and the computer program code are configured to further cause the apparatus to receive the bandwidth part configuration via broadcast signalling, radio resource control signalling or higher-layer signalling.

4. The apparatus according to claim 1, wherein a bundle size in terms of physical resource blocks is constant in the bundle grid before the re assigning.

5. The apparatus according to claim 1, wherein the at least one processing core and the computer program code configured to cause the apparatus to re-align the first physical resource block and re-align the last physical resource block further comprises the at least one processing core and the computer program code configured to further cause the apparatus to renumber bundles, such that following the re-aligning the bundles are consecutively numbered.

6. The apparatus according to claim 1, wherein the at least one processing core and the computer program code configured to cause the apparatus to reassign comprises the at least one processing core and the computer program code configured to further cause the apparatus to re-assign the at least one non-overlapping physical resource block to the immediately preceding bundle when the overlapping physical resource blocks are last in the partially overlapped bundle, and to re-assign the at least one non overlapping physical resource block to the immediately following bundle when the overlapping physical resource blocks are first in the partially overlapped bundle.

7. The apparatus according to claim 1, wherein the at least one processing core and the computer program code are configured to further cause the apparatus to use the re-assigned or re-aligned non overlapping physical resource blocks in transmission or reception of a wireless signal.

8. An apparatus comprising at least one processing core, at least one memory comprising a computer program code, the at least one memory and the computer program code being configured to, with the at least one processing core, cause the apparatus at least to:

provide a user device with a bandwidth part configuration indicating an arrangement of the bandwidth part into plural physical resource blocks which are grouped into bundles forming a bundle grid, the bandwidth part comprising at least one guard band;

determine at least one of the bundles as partially overlapping with the at least one guard band, each partially overlapping bundle comprising overlapping and non-overlapping physical resource blocks, and to at least one of:

re-assign at least one of the non-overlapping physical resource blocks to a non-overlapping bundle immediately preceding or immediately following, in the bundle grid, the partially overlapping bundle, re-align a first physical resource block of the non-overlapping bundle immediately following the partially overlapped bundle to coincide with a guard band end, and re-align a last physical resource block of the non-overlapping bundle immediately preceding the partially overlapped bundle to coincide with a guard band start.

9. The apparatus according to claim 8, wherein the bandwidth part is a wideband bandwidth part comprising at least two sub-bands, and the at least one guard band is between the at least two sub-bands.

10. The apparatus according to claim 8, wherein the at least one processing core and the computer program code are configured to cause the apparatus to provide the bandwidth part configuration via broadcast signalling, radio resource control signalling or higher-layer signalling.

11. The apparatus according to claim 8, wherein a bundle size in terms of physical resource blocks is constant in the bundle grid before the re-assigning.

12. The apparatus according to claim 8, wherein the at least one processing core and the computer program code configured to cause the apparatus to re-align the first physical resource block and re-align the last physical resource block comprises the at least one processing core and the computer program code configured to cause the apparatus to renumber bundles, such that following the re-aligning the bundles are consecutively numbered.

13. The apparatus according to claim 8, wherein the at least one processing core and the computer program code configured to cause the apparatus to re-assign comprises the at least one processing core and the computer program code configured to further cause the apparatus to re-assign the at least one non-overlapping physical resource block to the immediately preceding bundle when the overlapping physical resource blocks are last in the partially overlapped bundle, and reassign the at least one non overlapping physical resource block to the immediately following bundle when the overlapping physical resource blocks are first in the partially overlapped bundle.

14. The apparatus according to claim 8, wherein the at least one processing core and the computer program code are configured to further cause the apparatus to use the re-assigned or re-aligned non-overlapping physical resource blocks in transmission or reception of a wireless signal.

15. A method, comprising:

storing a bandwidth part configuration indicating an arrangement of the bandwidth part into plural physical resource blocks which are grouped into bundles forming a bundle grid, the bandwidth part comprising at least one guard band;

determining at least one of the bundles as partially overlapping with the at least one guard band, each partially overlapping bundle comprising overlapping and non-overlapping physical resource blocks, and at least one of:

re-assigning at least one of the non-overlapping physical resource blocks to a non-overlapping bundle immediately preceding or immediately following, in the bundle grid, the partially overlapping bundle, re-aligning a first physical resource block of the non-overlapping bundle immediately following the partially overlapped bundle to coincide with a guard band end, and re-aligning a last physical resource block of the non-overlapping bundle immediately preceding the partially overlapped bundle to coincide with a guard band start.

16. The method according to claim 15, wherein the bandwidth part is a wideband bandwidth part comprising at least two sub-bands, and the at least one guard band is between the at least two sub-bands.

17. The method according to claim 15, further comprising receiving the bandwidth part configuration via broadcast signalling, radio resource control signalling or higher-layer signalling.

18. The method according to claim 15, wherein a bundle size in terms of physical resource blocks is constant in the bundle grid before the re-assigning.

19. The method according to claim 15, wherein the re-aligning the first physical resource block and the re-aligning the last physical resource block further comprises renumbering bundles, such that following the re-aligning the bundles are consecutively numbered.

20. The method according to claim 15, wherein the re-assigning further comprises re-assigning the at least one non-overlapping physical resource block to the immediately preceding bundle when the overlapping physical resource blocks are last in the partially overlapped bundle, and re-assigning the at least one non overlapping physical resource block to the immediately following bundle when the overlapping physical resource blocks are first in the partially overlapped bundle.

21. The method according to claim 15, further comprising using the re-assigned or re-aligned non-overlapping physical resource blocks in transmission or reception of a wireless signal.

22. A method, comprising:

providing a user device with a bandwidth part configuration indicating an arrangement of the bandwidth part into plural physical resource blocks which are grouped into bundles forming a bundle grid, the bandwidth part comprising at least one guard band;

determining at least one of the bundles as partially overlapping with the at least one guard band, each partially overlapping bundle comprising overlapping and non-overlapping physical resource blocks, and at least one of:

re-assigning at least one of the non-overlapping physical resource blocks to a non-overlapping bundle immediately preceding or immediately following, in the bundle grid, the partially overlapping bundle, re-aligning a first physical resource block of the non-overlapping bundle immediately following the partially overlapped bundle to coincide with a guard band end, and re-aligning a last physical resource block of the non-overlapping bundle immediately preceding the partially overlapped bundle to coincide with a guard band start.

23. The method according to claim 22, wherein the bandwidth part is a wideband bandwidth part comprising at least two sub-bands, and the at least one guard band is between the at least two sub-bands.

24. The method according to claim 22, wherein the providing the bandwidth part configuration is carried out via broadcast signalling, radio resource control signalling or higher-layer signalling.

25. The method according to claim 22, wherein a bundle size in terms of physical resource blocks is constant in the bundle grid before the re-assigning.

26. The method according to claim 22, wherein the re-aligning the first physical resource block and the re-aligning the last physical resource block further comprises renumbering bundles, such that following the re-aligning the bundles are consecutively numbered.

27. The method according to claim 22, wherein the re-assigning further comprises re-assigning the at least one non-overlapping physical resource block to the immediately preceding bundle when the overlapping physical resource blocks are last in the partially overlapped bundle, and re-assigning the at least one non overlapping physical resource block to the immediately following bundle when the overlapping physical resource blocks are first in the partially overlapped bundle.

28. The method according to claim 22, further comprising using the re-assigned or re-aligned non-overlapping physical resource blocks in transmission or reception of a wireless signal.

* * * * *